United States Patent [19]

Valle et al.

[11] Patent Number: 5,224,774
[45] Date of Patent: Jul. 6, 1993

[54] CONCRETE ADDITIVE PRODUCT AND METHOD OF USE

[75] Inventors: Stephen A. Valle, Bradford; John E. Sorenson, Reading, both of Mass.; Robert C. Hegger, Oak Park; Walter W. Wydra, Itasca, both of Ill.

[73] Assignee: W. R. Grace & Co.-Conn., New York, N.Y.

[21] Appl. No.: 563,580

[22] Filed: Aug. 7, 1990

[51] Int. Cl.$^5$ .............................................. B01F 17/00
[52] U.S. Cl. ........................................ 366/2; 366/150; 206/524.7
[58] Field of Search ................ 366/19, 150, 349, 102, 366/1, 18, 76; 206/524.7, 524.1, 524.6, 216, 527; 222/87

[56] References Cited

U.S. PATENT DOCUMENTS

| | | | |
|---|---|---|---|
| 231,960 | 9/1880 | Hoodes | 206/524.7 |
| 931,350 | 8/1909 | Tnoma | 206/524.7 |
| 2,127,402 | 8/1938 | Gillican | 206/524.1 |
| 2,560,649 | 7/1951 | Hornaday | 206/524.7 |
| 3,216,566 | 11/1965 | Rosenthal | 206/524.1 |
| 3,294,224 | 12/1966 | Horwitz | 206/524.7 |
| 3,431,166 | 5/1969 | Muzutani . | |
| 3,859,125 | 1/1975 | Miller et al. . | |
| 3,892,905 | 7/1975 | Albert | 206/524.7 |
| 4,210,009 | 7/1980 | Farfor et al. . | |
| 4,344,266 | 8/1982 | Gray . | |
| 4,426,458 | 1/1984 | Woodhams . | |
| 4,518,725 | 5/1985 | Guicquero . | |
| 4,555,354 | 11/1985 | Clarke et al. . | |
| 4,657,593 | 4/1987 | Aignesberger et al. . | |
| 4,665,109 | 5/1987 | Pedersen et al. . | |
| 4,748,069 | 5/1988 | Cullen | 206/524.7 X |
| 4,814,014 | 3/1989 | Afraei . | |
| 4,844,828 | 7/1989 | Aoki | 206/524.7 |
| 4,961,790 | 10/1990 | Smith et al. . | |

OTHER PUBLICATIONS

W. R. Grace Technical Data Sheet, "Fibre Reinforcement for Concrete", 1989.
C1116-89, "Standard Specification for Fiber-Reinforced Concrete and Shotcrete", vol. 04.02, pp. 571-578 (1990).
Grant, *Grant & Hackh's Chemical Dictionary*, 5th ed., p. 338 (1987).
Kirk-Othmer, *Encyclopedia of Chemical Technology*, 3rd ed., vol. 16, p. 801 (1981).
W. R. Grace & Co.-Conn., Technical Data Sheet entitled "Grace-Fibers TM —Fiber Reinforcement for Concrete" 1989.
"Fine Particle Size Vermiculite"; W. R. Grace & Co.--Conn.; Oct. 1990.

*Primary Examiner*—Frankie L. Stinson
*Attorney, Agent, or Firm*—Craig K. Leon; John J. Wasatonic; William L. Baker

[57] ABSTRACT

The present invention relates to an improved concrete additive product comprising synthetic concrete reinforcing fibers packaged in a closed paper package, whereby under the influence of mechanical action in a concrete mixer, the packaging material disintegrates and the fibers are uniformly distributed throughout the fresh concrete mixture. The synthetic fibers may additionally be coated with a dispersant. The present invention also relates to the methods of using the above improved concrete additive product.

49 Claims, 1 Drawing Sheet

CONCRETE ADDITIVE PRODUCT AND METHOD OF USE

TECHNICAL FIELD

This invention relates to an improvement in the field of concrete additives useful in decreasing the potential for early drying cracking of concrete. Specifically, this invention relates to a concrete-ready bag containing reinforcing fibers which is added directly to a concrete mixer, or similar apparatus, during a concrete mixing operation.

BACKGROUND

It is well known in the construction industry to add fibers to fresh concrete to improve the characteristics of the resulting hardened concrete structure. Fibers, such as steel, glass or synthetic materials are typically added to the mixture. See for example, U.S. Pat. No. 4,665,109 to Pedersen, et al., issued May 12, 1987; U.S. Pat. No. 4,426,458 to Woodhams, issued Jan. 17, 1984; and U.S. Pat. No. 4,210,009 to Farfor, et al., issued Jul. 1, 1980. Fiber-reinforced concretes are said to have improved fracture toughness as well as a retarded degree of crack propagation.

These concrete-reinforcing fibers are packaged and sold in polyethylene bags and the fibers are added to the concrete mixture by opening the package and shoveling or dumping the fibers directly into a concrete mixer, or similar apparatus, during the concrete mixing operation. This labor intensive task is often messy and can also result in a non-uniform dispersion of fibers when clumps of fibers become encased in the fresh concrete mixture and resist wetting due to their hydrophobic nature. Accordingly, it is desirable to have a means of dispersing concrete reinforcing fibers which is less labor intensive, less messy and more effective at uniformly distributing the fibers through out the mixture.

It is an objective of the present invention to provide a concrete additive product in the form of a fiber-containing package which is easier to administer to a concrete mixing operation and which also imparts improved fiber distribution throughout the fresh concrete mixture.

It is also an object of the present invention to provide a method for uniformly distributing fibers throughout fresh concrete.

These and other objects will be made apparent from the following:

SUMMARY OF THE INVENTION

In the construction field, many methods of strengthening concrete have been developed through the years. One modern method involves distributing fibers throughout a fresh concrete mixture. Upon hardening, this concrete is referred to as fiber-reinforced concrete. Fibers can be made of steel, glass, or synthetic materials, e.g., polypropylene, nylon, polyethylene, polyester, rayon, high-strength aramid, (i.e. Kevlar®), or mixtures thereof. Preferred fibers of the present invention are synthetic fibers. Preferred synthetic fibers, according to the present invention, are manufactured from 100% virgin polypropylene in collated, fibrillated form. Preferred fibers are about ½ to about ¾ inch in length. Fibers, in general, are further discussed in ASTM designation C116, "Standard Specification for Fiber-Reinforced Concrete and Shotcrete", incorporated herein by reference.

In commercial applications, the fibers are typically added to a concrete mixer by shoveling the fibers from a shipping bag or merely opening the bag and dumping the contents directly into the concrete mixer during the concrete mixing operation. This process is very labor intensive, very messy, and often results in a non-uniform dispersion of fibers, since hydrophobic fibers, like polypropylene, resist wetting and can clump together into slow dispersing balls. Surprisingly, it has been discovered that improved dispersion of fibers can be achieved by packaging the fibers in a bag or pouch which disintegrates during the concrete mixing operation. Thus, the fibers are gradually dispersed as the concrete mixes. It has also been found that this distribution, as well as concrete strength, can be enhanced by including a dispersant in the packaging of the fibers.

Specifically, the present invention relates to a method for providing a relatively uniform distribution of fibers throughout a fresh concrete mixture by placing one or more closed packages containing a cumulatively effective amount of fibers directly into the fresh concrete mixture under sufficient agitation so as to cause the packaging material to disintegrate and dispense the fibers.

The present invention also relates to an improved concrete additive product in the form of synthetic fibers suitable for preventing early cracking of concrete, wherein the improvement comprises containing the fibers within a closed paper bag, whereby under the influence of mechanical action in a concrete mixer, the fibers are uniformly distributed throughout the fresh concrete. Preferably the improved concrete additive product further comprises an effective amount of dispersant packaged with the fibers.

The present invention also relates to a method for uniformly distributing synthetic fibers throughout a fresh concrete comprised of the steps of: (a) placing a closed package containing an effective amount of said fibers directly into said fresh concrete, and (b) mixing the fresh concrete in a batch type concrete mixer for sufficient time to cause the packaging material to disintegrate and dispense said fibers, wherein the package material is paper.

DETAILED DESCRIPTION OF THE INVENTION

Figure 1:
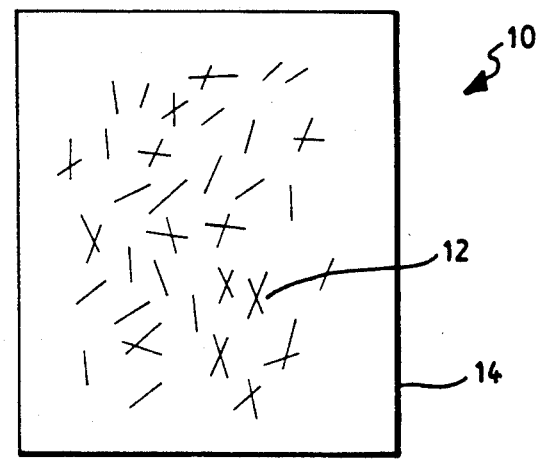
FIG. 1 is an illustrative representation of an exemplary concrete admixture package of the present invention.

FIG. 1 illustrates a concrete admixture package 10 of the invention which comprises synthetic fibers 12 operative to dispense throughout a volume of fresh concrete upon agitation of the concrete and to reinforce the concrete when set; and a closed non-soluble paper bag 14 enclosing the fibers 12, the bag operative to disintegrate in agitated fresh concrete and uniformly distribute the fibers throughout the fresh concrete.

As used herein, the term "effective amount" of reinforcing fibers means an adequate quantity of fibers per cubic meters of hardened concrete to impart an improvement in the early crack resistance of the resulting material. In most concrete operations, this means from about 0.1 lbs. to about 300 lbs. of fibers per cubic meter of concrete. For synthetic fibers, the effective amount is from about 0.2 lbs. to about 20.0 lbs. per cubic meter of concrete, preferably from about ¾ to about 3 lb. per cubic meter. Often, more than one bag of fiber material is added to a commercial concrete mixer. As a result, the total amount of fibers from the bags must "cumulatively" result in an effective amount. Typically, one bag containing about 1.5 lb. of fibers is added to each cubic meters of concrete (dry weight).

As used herein, the term "uniform distribution" or "relatively uniform distribution" means that the fibers are distributed in such a manner as that no clumps of fiber larger than 0.5 inches (1.27 centimeters) in diameter can be detected in the mixture.

As used herein the term "batch type concrete mixer" means any batch mixer suitable for thoroughly mixing cement and aggregates so as to obtain a homogeneous mass and coat all particles with cement paste. Preferred concrete mixers are: (1) rotating mixers, consisting of a revolving drum or a square box revolving about its diagonal axis and usually provided with deflectors and blades to improve the mixing; or (2) paddle mixers, consisting of a stationary box with movable paddles which perform the mixing. Rotating mixers are most preferred for use in the present invention.

Many manufacturers have developed water soluble papers. For example, Gilbreth Company, Philadelphia Pa., markets "Dissolve", which is a water soluble paper prepared by coating synthetic paper with polyvinyl alcohol. The resoluble papers comprise carboxy methyl cellulose and the sodium or potassium salt of carboxy methyl cellulose. (See U.S. Pat. No. 3,859,125 issued Jan. 7, 1975 to Miller, et al.) These specialized papers would surely dissolve in the aqueous environment of a concrete mixing operation. However, these papers are very expensive and, without being bound by theory, it is believed that these papers would dissolve too rapidly and could produce a large clump of fibers within the mix which might resist distribution. Furthermore, the alcohol coatings of the soluble paper have a detrimental effect on the resulting concrete as they tend to detrain air in the wet mix.

Applicants have discovered that a packaged material prepared from paper of a non-soluble, traditional variety abrades more slowly and, surprisingly, distributes the fibers very uniformly throughout the fresh concrete mixture. These non-soluble papers tend to disintegrate upon the wet abrasion found in the concrete mixer, they do not dissolve, because the cellulosic materials found within the paper are insoluble in water. The abrasion of the sand, gravel and other concrete components causes the paper to disintegrate, i.e. fragment into pieces which are unnoticeable to the human eye and have no detrimental effect on the properties of the finished concrete. Preferred papers contemplated in the present invention include repulpable and beater paper, shopping bag kraft paper, and multiwall kraft paper. The most preferred papers are repulpable, beater papers. Flexible paper container material are further described in Kirk-Othmer, *Encyclopedia of Chemical Techonolgy*, 3rd ed. (1981), vol. 16, page 801, incorporated herein by reference.

One paper which is particularly effective in the present invention is a 50 lb. white beater paper. This paper is fabricated from 100% pine pulp, has a basis weight of about 50 lb., a machine direction tear of about 109, a machine direction tensile of about 16, sizing of about 0, a brightness (TAPPI) of about 80.0, and a moistron moisture of about 5.6%. These paper specification determinations are further described in Kirk-Othmer, *Encyclopedia of Chemical Technology*, 3rd ed., (1981), Vol. 1b, pp. 771-780, incorporated herein by reference. This paper can be fabricated into a bag or pouch. Union Camp Corporation, Wayne, N.J., fabricates a 50 lb. white multi-wall beater paper bag which is most preferred in the present invention.

Bags or pouches can be fabricated in any shape, provided that they fit into the fill opening of a standard concrete mixture. A preferred embodiment of the present invention includes 1.5 lb. of a polypropylene fiber contained in a 15"×14" flat pillow pouch fabricated from the 50 lb. white multiwall beater paper bag described above.

The bag or pouch is typically placed inside the concrete mixer drum via the drum opening. This may be done before introducing the other concrete components, during the introduction of the concrete components, after the introduction of the concrete components, or any combination of the three. Mixing times should be at least about 5 minutes.

Applicants have discovered that it is also helpful to seal bags of the present invention with a water soluble adhesive. These adhesives can be any water soluble or water miscible adhesive which imparts sufficient bond strength to prevent premature opening of the bag in transit. It is also important that the adhesive does not impart any deliterious qualities to the resulting concrete. A typical water soluble adhesive suitable for use in the present invention is a one-part acrylic copolymer emulsion adhesive.

It has also been discovered that distribution of fibers can be improved by including a dispersant in the package along with the fibers. These dispersants can be water-reducing and high-range water-reducing dispersants selected from the group consisting of lignosulfonates (e.g., sodium lignosulfonate), naphthlene sulfonate, malemine sulfonate, "superplasticizers" (like those described in U.S. Pat. Nos. 4,518,725 to Arfaei on Mar. 21, 1989; 4,657,593 to Aignesberger et al. on Apr. 4, 1987; and 4,814,014 to Guicquero on May 21, 1985, incorporated herein by reference), and mixtures thereof. Preferred dispersants are lignosulfonate and naphthlene sulfonate. Liquid dispersants are added to the fibers by spraying or any other acceptable coating means. Dry dispersants, in powder form, may be added directly to the bag containing the fibers. The ratio of dispersant to fibers is typically from about 1:1 to about 1:15 w/w. The preferred ratio of dispersant of fibers is from about 1:6 to about 1:9 w/w. The level of dispersant can vary based on the dispersant itself.

The following examples depict typical embodiments of the present invention:

EXAMPLE I

Method of Preparing the Improved Concrete Additive Product of the Present Invention A quantity of 1.5 lb. of collated, fibrillated polypropylene fibers which are ¾" in length and are weighed. The fibers are distributed by W. R. Grace & Co.-Conn. under the name GRACE FIBERS ™. These fibers have the following typical properties:

| | |
|---|---|
| Specific Gravity | 0.91 |
| Absorption | None |
| Modulus of Elasticity | 500 ksi |
| Melt Point | 160° C. |

| | |
|---|---|
| Ignition Point | 590° C. |
| Alkali, Acid + Salt Resistance | High |

The fibers are spray coated with naphthlene sulfonate dispersant solution, wherein the fibers are coated with 90 gm of dispersant.

The coated fibers are manually packaged in a 14"×15" 50 lb. white multi-wall beater paper flat pillow-type bag, manufactured by Union Camp Corp., Wayne, N.J. The bag comprises one open end which has a lip coated with a water soluble pressure sensitive adhesive. The adhesive is protected by a cover strip to prevent contamination of the adhesive surface.

After the bag is full, the cover strip is removed from the lip at the open end of the bag, exposing the adhesive. The adhesive lip is folded so that the bag is closed and the adhesive is contacting the bag fully. Manual pressure is then applied to seal the bag firmly. Finally, the bag is placed in a cardboard box for shipping.

EXAMPLE II

Alternative Method of Preparing the Improved Concrete Additive Product of the Present Invention A quantity of 1.5 lb. of collated, fibrillated polypropylene fibers which are ½" in length are weighed. The fibers are distributed by W. R. Grace & Co.-Conn., Cambridge, Mass. under the name GRACE FIBERS ™. These fibers have the following typical properties:

| | |
|---|---|
| Specific Gravity | 0.91 |
| Absorption | None |
| Modulus of Elasticity | 500 ksi |
| Melt Point | 160° C. |
| Ignition Point | 590° C. |
| Alkali, Acid + Salt Resistance | High |

The fibers are manually packaged in a 14"×15" 50 lb. white multi-wall beater paper flat, pillow-type bag, manufactured by Union-Camp Corp., Wayne, N.J. The bag comprises one open end which has a lip coated with a water soluble, pressure-sensitive adhesive. The adhesive is protected by a cover strip to prevent contamination of the adhesive surface.

90 gm. of sodium lignosulfonate (lignosite 458, manufactured by Georgia-Pacific Corp.) are added directly into the bag through the opening.

The bag is fed into an automatic sealing/folding machine. The machine then removes the cover from the lip, folds the adhesive lip to close the bag, and applies enough pressure to seal the bag. The bag is then put into a cardboard box for shipping.

EXAMPLE III

Method of Using the Improved Dispersant-Free Concrete Additive Products of the Present Invention.

A quantity of 1.5 lb. of collated, fibrillated polypropylene fibers which are ½" in length are weighed. The fibers are distributed by W. R. Grace & Co.-Conn., Cambridge, Mass. under the name GRACE FIBERS ™. These fibers have the following typical properties:

| | |
|---|---|
| Specific Gravity | 0.91 |
| Absorption | None |
| Modulus of Elasticity | 500 ksi |
| Melt Point | 160° C. |
| Ignition Point | 590° C. |
| Alkali, Acid + Salt Resistance | High |

The fibers are manually packaged in a 14"×15" 50 lb. white multi-wall beater paper flat, pillow-type bag, manufactured by Union-Camp Corp., Wayne, N.J. The bag comprises one open end which has a lip.

The bag is fed into an automatic sealing/folding machine. The machine then applies the adhesive to the bag lip, folds the bag to close the bag, and applies enough pressure to seal the bag. The bag is then put into a cardboard box for shipping.

EXAMPLE IV

Method of Using the Improved Concrete Additive Products of the Present Invention.

The concrete additive product of Example I is removed from the cardboard box. The bag is placed in a revolving drum-type rotating concrete mixer containing 1 m³ of fresh ready-mix concrete mixture through the drum opening. The fresh concrete and bag are mixed for 5 minutes. No lumps of fibers greater that ½ inch (1.27 cm) in diameter are observed in the resulting fresh concrete.

EXAMPLE V

Alternative Method of Using the Improved Concrete Additive Products of the Present Invention The concrete additive product of Example II is removed from the cardboard box. The bag is placed in a revolving drum-type rotating concrete mixer via an automated magazine feed dispenser which introduces the bag to the other concrete components at a rate of one bag per 1 m³ of concrete. Water is added to the dry mix and the fresh concrete slurry is mixed by rotating the drum for 5 minutes. No lumps of fibers greater and ½ inch (1.27 cm.) are observed in the resulting fresh concrete.

What is claimed is:

1. A method for providing a relatively uniform distribution of fibers throughout fresh concrete, comprising the steps of:
   placing one or more closed non-soluble paper packages into fresh concrete, said packages containing a cumulatively effective amount of fibers operative to reinforce the concrete when set; and
   agitating the fresh concrete to cause the packaging material to disintegrate and dispense said fibers uniformly throughout the fresh concrete.

2. A method according to claim 1, wherein the paper is selected from the group consisting of repulpable and beater paper, shopping bag Kraft paper and Multiwall Kraft paper.

3. A method according to claim 2 wherein the paper is a repulpable, beater paper.

4. A method according to claim 3, wherein said fibers are synthetic fibers.

5. A method according to claim 4 wherein said fibers are selected from the group consisting of polypropylene, nylon, polyester, rayon, high-strength aramid or mixtures thereof.

6. A method according to claim 5 wherein the level of fibers is from about 0.1 lb. to about 300.0 lb. per cubic meter of concrete.

7. A method according to claim 6 wherein the level of fibers is from about 0.2 lb. to about 20.0 lb. per cubic meter of concrete.

8. A method according to claim 6 wherein said fibers have been packaged along with a dispersant.

9. A method according to claim 8 wherein the dispersant is selected from the group consisting of lignosulfonate, naphthlene sulfonate, malemine sulfonate, super-plasticizer or mixtures thereof.

10. A method according to claim 9 wherein the dispersant is selected from the group consisting of lignosulfonate and naphthlene sulfonate.

11. A method according to claim 9 wherein the ratio of dispersant to fibers is from about 1:1 to about 1:15, on a weight basis.

12. A method according to claim 11 wherein the ratio of dispersant to fibers is form about 1:6 to about 1:9, on a weight basis.

13. A method according to claim 12, wherein the package is sealed with a water soluble adhesive composed of a one-part acrylic copolymer emulsion adhesive.

14. A method according to claim 13 wherein the number of packages is one per cubic meter of concrete, on a dry weight basis.

15. A method for uniformly distributing fibers throughout fresh concrete, comprising the steps of:
(a) placing a closed non-soluble paper package containing an effective amount of fibers directly into fresh concrete, said fibers operative to reinforce the concrete when set; and
(b) mixing the fresh concrete of step (a) in a batch type mixer for sufficient time to cause the package to disintegrate and uniformly distribute said fibers throughout the fresh concrete.

16. A method according to claim 15 wherein the mixing time of step (b) is at least 5 minutes.

17. A method according to claim 16 wherein said fibers are selected form the group consisting of polyester fibers, nylon fibers, rayon fibers, polyethylene fibers, high-strength aramid fibers or mixtures thereof.

18. A method according to claim 17 wherein said fibers are polypropylene fibers.

19. A method according to claim 18 wherein the level of fibers is from about 0.1 lb. to about 300.0 lb. per cubic meter of concrete.

20. A method according to claim 19 wherein the level of fibers is from about 0.2 lb. to about 20.0 lb. per cubic meter of concrete.

21. A method according to claim 19 wherein the batch type mixer of step (b) is a rotating mixer.

22. A method according to claim 21 wherein said fibers have been packaged with a dispersant.

23. A method according to claim 22 wherein the dispersant is selected form the group consisting of lignosulfonate, naphthlene sulfonate, malemine sulfonate, super-plasticizer or mixtures thereof.

24. A method according to claim 23 wherein the dispersant is selected from the group consisting of lignosulfonate and naphthlene sulfonate.

25. A method according to claim 24 wherein the ratio of dispersant to fibers is from about 1:1 to about 1:15, on a weight basis.

26. A method according to claim 25 wherein the ratio of dispersant to fibers is from about 1:6 to about 1:9 on a weight basis.

27. A method according to claim 26, wherein the paper is selected from the group consisting of repulpable and beater paper, shopping bag Kraft paper and multiwall Kraft paper.

28. A method according to claim 27 wherein the paper is a repulpable, beater paper.

29. A method according to claim 28 wherein the bag is sealed with a water soluble adhesive.

30. A method according to claim 29 wherein the water soluble adhesive is a one-part acrylic copolymer emulsion adhesive.

31. A method according to claim 30 wherein the number of packages is one per cubic meter of concrete.

32. A concrete admixture package, comprising:
synthetic fibers operative to dispense throughout a volume of fresh concrete upon agitation of the concrete and to reinforce the concrete when set, and
a closed non-soluble paper bag enclosing said fibers, said bag operative to disintegrate in agitated fresh concrete and uniformly distribute said fibers throughout the fresh concrete.

33. An improved product according to claim 32 wherein the fibers also have been coated with an effective amount of dispersant.

34. A product according to claim 33 wherein said fibers are selected from the group consisting of polypropylene, nylon, polyester, rayon, high-strength aramid, or mixtures thereof.

35. A product according to claim 34 wherein said fibers are polypropylene fibers.

36. A product according to claim 35 wherein the level of fibers is form about 0.1 lb. to about 300.0 lb. per cubic meter of concrete on a dry basis.

37. A product according to claim 36 wherein the level of fibers is from about 0.2 lb. to about 20.0 lb. per cubic meter of concrete on a dry basis.

38. A product according to claim 37 wherein the dispersant is selected from the group consisting of lignosulfonate, naphthlene sulfonate, malemine sulfonate, super-plasticizer, or mixtures thereof.

39. A product according to claim 38 wherein the dispersant is selected from the group consisting of lignosulfonate and naphthlene sulfonate.

40. A product according to claim 38 wherein the ratio of dispersant to fibers is form about 1:1 to about 1:15, on a weight basis.

41. A product according to claim 40 wherein the ratio of dispersant to fibers is from about 1:6 to about 1:9 on a weight basis.

42. A product according to claim 41 wherein the closed package is comprised of paper which is sealed with a water soluble adhesive.

43. A product according to claim 42 wherein the paper is selected from the group consisting of repulpable and beater paper, shopping bag Kraft paper and multiwall Kraft paper.

44. A product according to claim 42 wherein the paper is a repulpable, beater paper.

45. A product according to claim 42 wherein the water soluble adhesive is a one-part acrylic copolymer emulsion adhesive.

46. A method for providing a relatively uniform distribution of fibers throughout fresh concrete, comprising the steps of:

placing one or more closed non-water-soluble paper packages into fresh concrete, said packages containing a cumulatively effective amount of fibers operative to reinforce the concrete when set; and agitating the fresh concrete to cause the packaging material to disintegrate by fragmenting into pieces which are not detrimental to the properties of the finished concrete and to dispense said fibers uniformly throughout the fresh concrete.

47. The method of claim 46 further comprising the step of providing a revolving batch mixer into which said non-water-soluble packages are placed.

48. The method of claim 46 further comprising the step of providing a cement mixing truck into which said non-water-soluble packages are placed.

49. A concrete admixture package, comprising:
synthetic fibers operative to dispense throughout a volume of fresh concrete upon agitation of the concrete and to reinforce the concrete when set, and a closed non-water-soluble paper bag enclosing said synthetic fibers, said bag operative when agitated in fresh concrete to disintegrate by fragmenting into pieces which are not detrimental to the properties of the finished concrete and to result thereby in the uniform distribution of said fibers throughout the fresh concrete.

* * * * *